United States Patent
Wurmb et al.

[11] 3,963,668
[45] June 15, 1976

[54] REINFORCED POLYOXYMETHYLENE MOLDING COMPOSITIONS

[75] Inventors: Rolf Wurmb, Heidelberg; Franz Schmidt, Mannheim; Harro Petersen, Frankenthal, all of Germany

[73] Assignee: BASF Aktiengesellschaft, Ludwigshafen (Rhine), Germany

[22] Filed: Feb. 13, 1975

[21] Appl. No.: 549,660

[52] U.S. Cl............ 260/37 AL; 260/39 SB; 260/849
[51] Int. Cl.²........................ C08K 9/04
[58] Field of Search........ 260/37 AL, 39 R, 39 SB, 260/42.16, 849

[56] References Cited
UNITED STATES PATENTS

| | | | |
|---|---|---|---|
| 3,296,194 | 1/1967 | Wagner et al. | 260/37 AL X |
| 3,455,867 | 7/1969 | Berardinelli et al. | 260/37 AL |
| 3,560,412 | 2/1971 | Bernardo | 260/849 X |
| 3,850,873 | 11/1974 | Wurmb et al. | 260/37 AL |

*Primary Examiner*—Donald E. Czaja
*Assistant Examiner*—S. M. Person
*Attorney, Agent, or Firm*—Johnston, Keil, Thompson & Shurtleff

[57] ABSTRACT

Thermoplastic molding compositions of polyoxymethylenes and glass fibers and containing from 0.1 to 5.0 per cent, by weight of the total weight of the mixture, of alkoxymethyl ureas having the formula

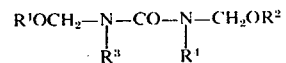

$$R^1OCH_2-N(R^3)-CO-N(R^4)-CH_2OR^2$$

where $R^1$ and $R^2$ are the same or different and denote straight-chain or branched-chain alkyl of from 1 to 10 carbon atoms and $R^3$ and $R^4$ denote hydrogen or alkyl, or $R^3$ and $R^4$ are joined together to form a heterocyclic ring with the adjacent ureido group.

4 Claims, No Drawings

REINFORCED POLYOXYMETHYLENE MOLDING COMPOSITIONS

This application discloses and claims subject matter described in German Patent Application No. P 24 08 534.5, filed Feb. 22, 1974, which is incorporated herein by reference.

It is known to reinforce polyoxymethylenes with glass fibers. By this measure, it is possible substantially to improve the rigidity of polyoxymethylenes and thus increase their range of applications.

However, it is generally only possible to achieve unsatisfactory improvement in the tensile strength of polyoxymethylenes by reinforcing with glass fibers. There has thus been no lack of attempts to improve the tensile strength of glass fiber reinforced polyoxymethylenes. For example, UK Patent No. 1,178,344 describes an expensive process for the manufacture of glass-fiber-reinforced polyoxymethylenes by polymerizing formaldehyde in the presence of glass fibers which have been provided with specific adhesion promotors. U.S. Patent No. 3,455,867 describes a process in which glass-fiber-reinforced polyoxymethylenes showning good properties are obtained by incorporating polyfunctional isocyanates. However, isocyanates have their handling problems on account of their toxicity. In addition to an improvement in the tensile strength it is also desirable to improve the impact resistance.

It is an object of the present invention to provide a simple process for the manufacture of glass-fiber-reinforced polyoxymethylenes showing good tensile strength.

According to the invention, this object is achieved by incorporating small amounts, i.e. from 0.1 to 5.0% by weight, of alkoxymethyl ureas of the formula

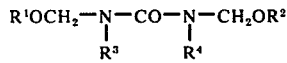

$$R^1OCH_2-\underset{R^3}{N}-CO-\underset{R^4}{N}-CH_2OR^2$$

in the glass-fiber-reinforced polyoxymethylenes.

The radicals $R^1$ and $R^2$ may be the same or different. They denote straight-chain or branched-chain alkyl of from 1 to 10 carbon atoms. $R^3$ and $R^4$ may be hydrogen or alkyl or may be joined together and to the adjacent ureido group to form a heterocyclic ring having, preferably, 5 or 6 ring atoms. The ring may contain, in addition to the two nitrogen atoms of the ureido grouping, an oxygen atom and may be substituted by alkyl of up to 6 carbon atoms. Alternatively, the radical $R^3$ may denote the group $-CH_2OR^5$, where $R^5$ is an aliphatic radical of from 1 to 10 carbon atoms.

Examples of compounds of the general formula are: N,N'-dimethoxymethyl urea, N,N'-diethoxymethyl urea, N-methoxymethyl-N'-methyl urea, N,N-dimethyl-N'-methoxymethyl urea, N,N,N'-trimethoxymethyl urea, N,N'-dimethoxymethyl-2-oxo-hexahydropyrimidine, N,N'-dimethoxymethyl-2-oxo-imidazolidine, N,N'-dimethoxymethyl-4-oxo-tetrahydro-1,3,5-oxadiazine and N,N'-dimethoxymethyl-2-oxo-5,5-dimethylhexahydropyrimidine.

The preferred amount of alkoxymethyl urea is from 0.5 to 2.5% w/w. The ureas may be prepared by conventional processes.

The glass fibers used for reinforcing the polyoxymethylenes are preferably low-alkali E-glass fibers having a diameter of from 5 to 20 and preferably from 8 to 15 μm. Their average length in the reinforced compositions is from 0.05 to 1.0 mm and preferably from 0.1 to 0.50 mm. The glass fibers are generally used in amounts of from 10 to 50%, based on the polyoxymethylene.

The glass fibers are treated in known manner with sizes and adhesion promoters based on organosilanes.

For the purposes of the present invention, polyoxymethylenes are homopolymers of formaldehyde and copolymers of formaldehyde or trioxane with cyclic and linear formals, for example 1,3-dioxalane, butandiol formal and epoxides such as ethylene oxide and propylene oxide.

The homopolymers should possess thermally stable end groups, for example ester or ether groups. The copolymers of trioxane should contain more than 50% and preferably more than 75% of oxymethylene groups and at least approximately 0.1% of groups of comonomer introducing at least two adjacent carbon atoms into the chain. Such copolymers may be prepared in known manner by cationic copolymerization of trioxane with suitable comonomers such as cyclic ethers or acetals such as ethylene oxide, 1,3-dioxolane, 1,3-dioxane, 1,3-dioxacycloheptane or with linear oligoformals or polyformals or acetals such as polydioxolane and polybutanediol formal.

The polymers may contain conventional thermal and light stabilizers and other additives such as dyes.

Incorporation of the alkoxymethylol ureas is advantageously effected together with the glass fibers and other additives by known processes, for example by blending in a suitable extruder. The glass fibers may be used as rovings or as chopped strands.

EXAMPLE

The polyoxymethylenes and glass fibers having a length of 6 mm are melted in a single-worm extruder with and without the addition of alkoxymethylol ureas. The mixture is homogenized at 200°C and extruded, the extrudate being granulated. The granules are injection molded at 200°C to form test specimens which are then tested for mechanical properties.

The test results are listed in the Table below.

TABLE

| Polyoxymethylene | Additive | glass fiber content (%) | tensile strength according to DIN 53455 (kg/cm²) | flexural strength according to DIN 53452 (kg/cm²) | impact resistance according to DIN 53453 (cmkg/cm²) |
|---|---|---|---|---|---|
| A | — | 30 | 904 | 1,163 | 10.2 |
| A | 0.5% of methoxymethylol urea | 30 | 1,307 | 1,821 | 18.3 |
| A | 1.0% of methoxymethylol urea | 30 | 1,509 | 1,993 | 22.3 |
| A | 1.0% of ethylene-bishydroxymethyl urea | 30 | 1,028 | 1,423 | 14.1 |

TABLE-continued

| Polyoxymethylene Additive | glass fiber content (%) | tensile strength according to DIN 53455 (kg/cm²) | flexural strength according to DIN 53452 (kg/cm²) | impact resistance according to DIN 53453 (cmkg/cm²) |
| --- | --- | --- | --- | --- |

Polyoxymethylene A: copolymer of trioxane with 4% w/w of ethylene oxide
melt index at 190°C under a load of 2.16 kg: 8 to 10

We claim:
1. An improved glass-fiber reinforced polyoxymethylene which contains, in addition to said polyoxymethylene and said glass fibers from 0.1 to 5% by weight based on the total weight of the composition of an alkoxymethyl urea.
2. An improved molding composition as set forth in claim 1 wherein said alkoxymethyl urea is selected from the group consisting of N,N'-dimethoxymethyl urea, N,N'-diethoxymethyl urea, N-methoxymethyl-N'-methyl urea, N,N-dimethyl-N'-methoxymethyl urea, N,N,N'-trimethoxymethyl urea, N,N'-dimethoxymethyl-2-oxohexahydropyrimidine, N,N'-dimethoxymethyl-2-oxo-imidazolidine, N,N'-dimethoxymethyl-4-oxo-tetrahydro-1,3,5-oxadiazine and N,N'-dimethoxymethyl-2-oxo-5,5-dimethyl-hexahydropyrimidine.
3. A molding composition as set forth in claim 1 wherein said alkoxymethyl urea is N,N'-dimethoxymethyl urea.
4. An improved molding composition as set forth in claim 1 where the amount of alkoxymethyl urea is from 0.5 to 2.5% by weight.

* * * * *